United States Patent
Laroche (10) Patent No.: US 11,149,574 B2
(45) Date of Patent: Oct. 19, 2021

(54) TURBINE ASSEMBLY WITH RING SEGMENTS

(71) Applicant: SAFRAN AIRCRAFT ENGINES, Paris (FR)

(72) Inventor: Clément Raphaël Laroche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/641,457

(22) PCT Filed: Sep. 3, 2018

(86) PCT No.: PCT/FR2018/052150
§ 371 (c)(1),
(2) Date: Feb. 24, 2020

(87) PCT Pub. No.: WO2019/048766
PCT Pub. Date: Mar. 14, 2019

(65) Prior Publication Data
US 2020/0200032 A1    Jun. 25, 2020

(30) Foreign Application Priority Data

Sep. 6, 2017 (FR) .................................. 1758232

(51) Int. Cl.
*F01D 11/00* (2006.01)
*F01D 9/04* (2006.01)

(52) U.S. Cl.
CPC .............. *F01D 11/005* (2013.01); *F01D 9/04* (2013.01); *F05D 2220/32* (2013.01);
(Continued)

(58) Field of Classification Search
CPC ................... F01D 11/005; F01D 11/08; F01D 11/12–127; F01D 9/04; F01D 9/041; F05D 2240/11; F05D 2240/55; F05D 2240/57
See application file for complete search history.

(56) References Cited

U.S. PATENT DOCUMENTS 5,624,227 A * 4/1997 Farrell .................. F01D 11/005
                                                        277/644
6,354,795 B1 * 3/2002 White ..................... F01D 11/24
                                                        415/116

(Continued)

FOREIGN PATENT DOCUMENTS

EP    1 099 826 A1    5/2001
EP    1 538 306 A1    6/2005
(Continued)

OTHER PUBLICATIONS

Huber, Thomas, et al., "Investigation of Strip Seal Leakage with Special Focus on Seal Groove Design and Relative Displacement of Sealing Surfaces," Proceedings of ASME Turbo Expo 2017: Turbomachinery Technical Conference, Charlotte, NC, Jun. 26-30, 2017, Paper No. GT2017-64440 (8 pages), (Year: 2017).*
(Continued)

*Primary Examiner* — Topaz L. Elliott
(74) *Attorney, Agent, or Firm* — Sughrue Mion, PLLC (57) ABSTRACT

The invention relates to a turbine assembly (1) comprising an annular structure extending circumferentially about an axial direction (DA) and comprising ring segments (10) arranged circumferentially end to end and comprising adjacent connection faces (13a), linked by linked by sealing tabs (21, 22) in the wall (11) and in the flange (12). The invention is characterised in that the grooves (31, 32) and tabs (21, 22) are curved, the tabs (21, 22) having a bending degree of freedom starting from their mounting position in the pres- (Continued)

ence of an air pressure exerted from upstream to downstream between the adjacent connection faces (13a, 13b) of the at least two adjacent ring sectors (10) during operation of the turbine, the tab (22) having a second point (220) which is in contact with a point (213) of the tab (21).

13 Claims, 8 Drawing Sheets

(52) U.S. Cl.
CPC ...... *F05D 2240/11* (2013.01); *F05D 2240/55* (2013.01); *F05D 2250/71* (2013.01)

(56) References Cited

U.S. PATENT DOCUMENTS

| | | | |
|---|---|---|---|
| 6,575,697 B1 | 6/2003 | Arilla et al. | |
| 7,351,030 B2 | 4/2008 | Soupizon et al. | |
| 7,513,740 B1 | 4/2009 | Hervy et al. | |
| 8,210,797 B2* | 7/2012 | Dueckershoff | F01D 9/041 |
| | | | 415/115 |
| 8,858,169 B2 | 10/2014 | Dakowski et al. | |
| 9,816,393 B2* | 11/2017 | Simon-Delgado | F01D 11/005 |
| 10,655,489 B2* | 5/2020 | Sarawate | F01D 11/005 |
| 10,858,948 B2* | 12/2020 | Laroche | F01D 9/065 |
| 2010/0028143 A1* | 2/2010 | Bailey | F01D 11/005 |
| | | | 415/202 |
| 2011/0286834 A1* | 11/2011 | Wardle | F01D 9/041 |
| | | | 415/115 |
| 2013/0108430 A1* | 5/2013 | Zimmermann | F01D 11/005 |
| | | | 415/208.1 |
| 2015/0037167 A1* | 2/2015 | Simon-Delgado | F01D 25/12 |
| | | | 416/97 R |
| 2018/0156069 A1 | 6/2018 | Quennehen et al. | |
| 2018/0363486 A1* | 12/2018 | Smoke | F01D 25/12 |
| 2019/0071990 A1* | 3/2019 | Laroche | F01D 9/065 |
| 2019/0203606 A1* | 7/2019 | Sarawate | F01D 9/041 |
| 2019/0383488 A1* | 12/2019 | Berry | F01D 9/023 |
| 2020/0173295 A1* | 6/2020 | Propheter-Hinckley | |
| | | | F01D 11/005 |

FOREIGN PATENT DOCUMENTS

| | | |
|---|---|---|
| EP | 1 586 743 A1 | 10/2005 |
| FR | 2 919 345 A1 | 1/2009 |
| FR | 2 942 845 A1 | 9/2010 |
| FR | 2 955 359 A1 | 7/2011 |
| FR | 2 957 115 A1 | 9/2011 |
| FR | 3 033 827 A1 | 9/2016 |
| FR | 3070716 A1 * | 3/2019 ............ F01D 11/005 |

OTHER PUBLICATIONS

International Search Report of PCT/FR2018/052150 dated Nov. 6, 2018 [PCT/ISA/210].

* cited by examiner

TURBINE ASSEMBLY WITH RING SEGMENTS

CROSS REFERENCE TO RELATED APPLICATIONS

This application is a National Stage of International Application No. PCT/FR2018/052150, filed Sep. 3, 2018, claiming priority to French Patent Application No. 1758232, filed Sep. 6, 2017, the entire contents of each of which are herein incorporated by reference in their entireties.

The invention relates to a turbine assembly such as for example a turbine nozzle or a shroud which must surround a movable turbine wheel, a turbomachine turbine provided therewith and a turbomachine provided with this turbine, in particular in an aircraft turbojet engine or an aircraft turboprop.

Such assemblies have an annular structure comprising sectors linked to each other around an axial direction from upstream to downstream.

Document FR-A-3 033 827 describes an assembly for a gas turbine, comprising a plurality of stationary vanes forming a nozzle having an outer platform provided with two upstream and downstream rims for connection to the stator, which extend radially outwardly. Adjacent side faces of the nozzle are placed end-to-end and comprise grooves formed opposite each other in the outer platforms, and sealing plates disposed individually in these grooves.

One problem with these assemblies is the leak between the sealing plates. Indeed, the air arriving from the external side and upstream of the assembly along the outer platform travels between the sealing plates. This results in a very significant air re-injection into the turbine stream, located downstream of the assembly, from the outside to the inside direction.

The invention aims to solve this problem and to obtain a turbine assembly avoiding or limiting leaks between the sealing plates.

To this end, a first object of the invention is a turbine assembly, comprising an annular structure extending circumferentially around an axial direction from upstream to downstream and comprising a plurality of ring sectors disposed circumferentially end-to-end, called adjacent ring sectors, each ring sector comprising at least one wall extending from upstream to downstream and at least one rim, protruding from the wall in a transverse direction which is secant with respect to the axial direction and which moves away from the wall, at least two adjacent ring sectors comprising adjacent connection faces, which are linked by at least a first sealing tab, inserted into a first internal groove of the connection faces, and by at least a second sealing tab, inserted into a second internal groove of the connection faces, connected to the first internal groove, the first sealing tab extending from upstream to downstream on at least a determined axial length in the wall and the second sealing tab extending into the rim, characterized in that the first internal groove and the second internal groove are curved, the first sealing tab and the second sealing tab are curved in a mounting position respectively in the first internal groove and in the second internal groove and have a bending degree of freedom starting from their mounting position in the presence of an air pressure exerted from upstream to downstream between the adjacent connection faces of the at least two adjacent ring sectors during operation of the turbine, the second sealing tab having at least a second point in contact with at least a first point of the first sealing tab.

Thanks to the invention, the air pressure which results from the air flow from upstream to downstream of the aerodynamic stream during the operation of the turbomachine presses the curved tabs against each other, which allows dynamically reducing or eliminating the leaks between the tabs at the gap present between the ring sectors, and reduces the passage of air into the stream from outside to inside.

According to one embodiment of the invention, the first point is intermediate between two first ends of the first sealing tab.

According to one embodiment of the invention, the first point is located at a first end of the first sealing tab.

According to one embodiment of the invention, the second point is intermediate between two second ends of the second sealing tab.

According to one embodiment of the invention, the second point is located at a second end of the second sealing tab.

According to one embodiment of the invention, the first point is intermediate between two first ends of the first sealing tab, the second point is intermediate between two second ends of the second sealing tab, the second sealing tab being tangent at this second point and/or at this first point to the first sealing tab.

According to one embodiment of the invention, the first internal groove and the second internal groove are tangent to each other around the first point and/or around the second point.

According to one embodiment of the invention, the second sealing tab has a concavity turned in the same orientation as the first sealing tab at the second point and at the first point.

According to one embodiment of the invention, the second internal groove has a concavity turned in the same orientation as the first internal groove at the second point and at the first point.

According to one embodiment of the invention, the first point is located on an external side of the first sealing tab.

According to one embodiment of the invention, the first point is located on an internal side of the first sealing tab.

According to one embodiment of the invention, the first sealing tab comprises two first ends, which are rounded and which have a first transverse end thickness, which is greater than a first intermediate transverse thickness of a first intermediate portion of the first sealing tab, located between the two first ends, and/or the second sealing tab comprises two second ends, which are rounded and which have a second transverse end thickness, which is greater than a second intermediate transverse thickness of a second intermediate portion of the second sealing tab, located between the two second ends. Wear is thus avoided.

According to one embodiment of the invention, the first sealing tab and the second sealing tab are prestressed in their mounting position respectively in the first internal groove and in the second internal groove. This improves the sealing by filling the clearances.

According to one embodiment of the invention, the first internal groove opens into a first upstream side of the ring sectors and in a first downstream side of the ring sectors in addition to opening into their connection face, while the second internal groove opens into a second upstream or downstream side of the rim of the ring sectors in addition to opening into their connection face.

According to one embodiment of the invention, another second sealing tab is inserted into another second internal groove of the rim, located in the connection faces and connected to the second internal groove, the other second internal groove being curved, the other second sealing tab being curved in a mounting position respectively in the other second internal groove and has a bending degree of freedom starting from its mounting position in the presence of an air pressure exerted from upstream to downstream between the adjacent connection faces of the at least two adjacent ring sectors during operation of the turbine, the other second sealing tab having at least a third point which is in contact with at least a fourth point of the second sealing tab.

According to one embodiment of the invention, the turbine assembly forms part of a turbine casing shroud, intended to surround a movable turbine wheel.

According to one embodiment of the invention, the first sealing tab has an inflection point between its first ends and/or the second sealing tab has an inflection point between its second ends. This limits disruptions in the main stream.

According to one embodiment of the invention, the annular structure forms part of a turbine nozzle, the second internal groove opens into a circumferentially bearing downstream protruding area for circumferential bearing of the rim of the ring sectors in addition to opening into their connection face, the turbine assembly further comprises a casing flange, which is located downstream of the circumferentially bearing downstream protruding area and against which bears the circumferentially bearing downstream protruding area, the casing flange comprising flange sectors disposed circumferentially end-to-end around the axial direction, called adjacent flange sectors, facing the ring sectors, at least two of the adjacent flange sectors comprising second adjacent connection faces, which are linked by at least a third sealing tab, inserted in a third internal groove of the second connection faces, the third internal groove opening into an upstream side of the second connection faces and being located facing the second internal groove and facing the circumferentially bearing downstream protruding area, the second sealing tab comprises a second end in contact with a third end of the third sealing tab. This improves the sealing between the casing flange and the nozzle thanks to the sealing tab which extends through the two elements.

According to one embodiment of the invention, the second end projects downstream of the circumferentially bearing downstream protruding area and/or the third end projects, towards the upstream, from the upstream side of the second connection faces.

According to one embodiment of the invention, an internal wall extending from upstream to downstream is provided as a wall, there is provided as a rim, an internal rim connected to the inside of the internal wall.

According to one embodiment of the invention, there is provided as a wall, an external wall extending from upstream to downstream, there is provided as a rim, an external rim connected to the outside of the external wall.

A second object of the invention is a turbine nozzle, comprising a turbine assembly as described above.

A third object of the invention is a turbine casing shroud intended to surround a movable turbine wheel, the shroud comprising a turbine assembly as described above.

A fourth object of the invention is a turbomachine turbine, comprising an external casing, a movable vane and a turbine assembly as described above, the turbine assembly being a turbine nozzle placed upstream of the vane movably mounted in rotation around the axial direction in the external casing.

A fifth object of the invention is a high-pressure turbomachine turbine, comprising an external casing, a movable vane and a turbine assembly as described above, the turbine assembly being a high-pressure turbine nozzle placed upstream of the vane movably mounted in rotation around the axial direction in the external casing.

According to one embodiment of the invention, the high-pressure turbine is mounted upstream of at least one low-pressure module comprising at least one low-pressure stage comprising another nozzle upstream of another wheel movably mounted in rotation around the axial direction, the high-pressure turbine being mounted downstream of a combustion chamber.

A sixth object of the invention is a turbomachine turbine, comprising an external casing comprising a turbine casing shroud as described above, a movable vane surrounded by the turbine casing shroud, and a turbine nozzle placed upstream of the vane movably mounted in rotation around the axial direction in the external casing.

The invention will be better understood upon reading the following description, given only by way of non-limiting example with reference to the appended drawings, in which.

In FIGS. 1 to 6, the turbine assembly 1 comprises an annular structure 400 extending circumferentially around an axial direction DA oriented from upstream to downstream. The assembly 1 comprises ring sectors 10 disposed circumferentially end-to-end, which form the annular structure 400 around the axial direction DA. Each ring sector 10 occupies for example a portion of a circle around the axial direction DA.

Each ring sector 10 comprises at least one wall 11, 30 extending from upstream to downstream and at least one rim 12, 42, protruding from the wall 11, 30 in a transverse direction DT. The transverse direction DT is secant with respect to the axial direction DA and moves away from the wall 11, 30. This transverse direction DT may be for example perpendicular to the axial direction DA.

At least two of these ring sectors are disposed end-to-end and are called adjacent ring sectors. For example, each ring sector 10 can comprise a longitudinal external wall 11 (or external platform 11 or external platform excluding the stream) extending from upstream to downstream and at least one external rim 12, 15 connected to the outside of the external wall 11, and capable for example of being radially protruding on this external wall 11. Each ring sector 10 may for example comprise an external rim 12, called downstream rim 12, connected to the outside of the external wall 11 and located downstream of another external rim 15, called upstream rim 15, which is also connected to the outside of the external wall 11, as represented in FIGS. 3 to 8.

Figure 1:
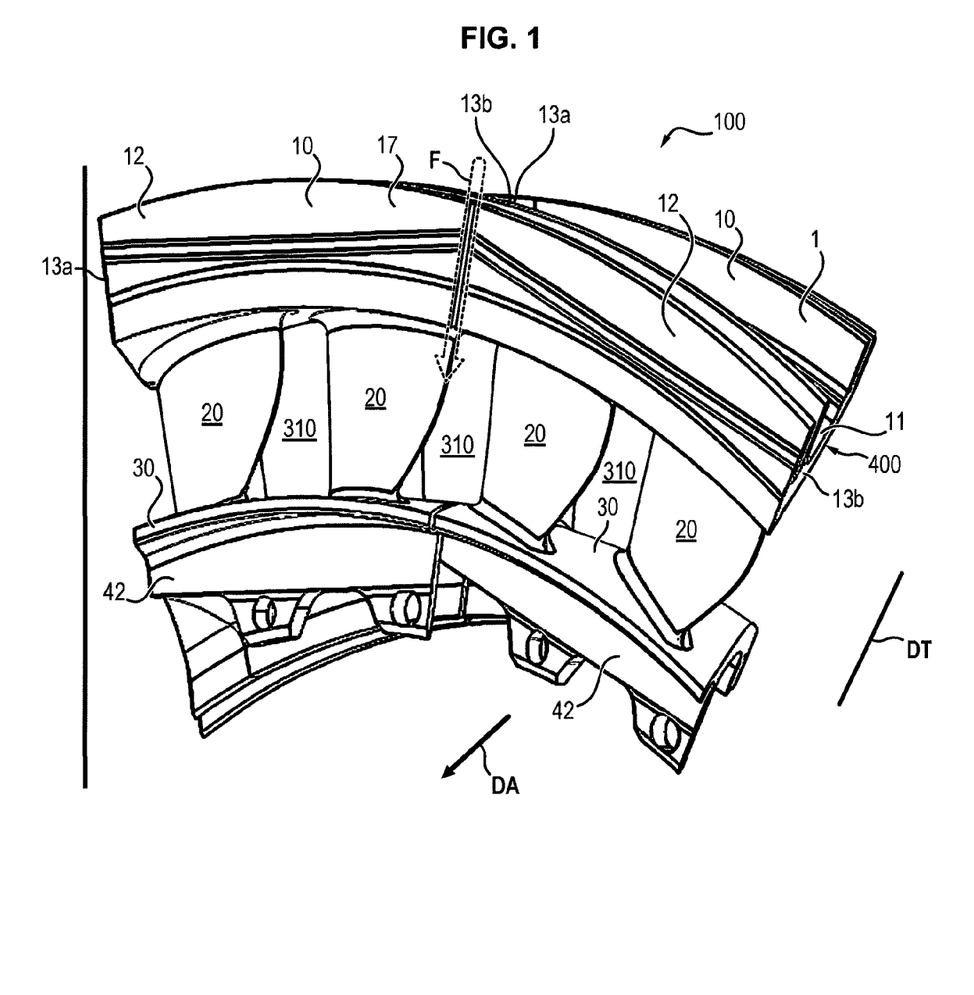
FIG. 1 represents a schematic perspective view of a turbine assembly, seen from downstream, according to one embodiment of the invention.

For example, each ring sector 10 may comprise an internal wall 30 (or internal platform 30 or internal platform 30 excluding the stream) extending from upstream to downstream, and an internal rim 42 connected to the inside of the internal wall 30, as represented in FIG. 1.

The following (grooves 31, 32, 33, tabs 21, 22, 23, 24) can be provided for the longitudinal external wall 11 and the external rim 12 thereof, as represented in FIGS. 3 to 8, and/or for the internal wall 30 and the internal rim 42 thereof, as represented in FIG. 1.

The turbine assembly 1 can form part of a turbine nozzle. In this case, each sector may comprise one or several stationary vane(s) 20 fixed between the longitudinal external wall 11 (or outer platform 11) and a longitudinal internal wall 30 (or inner platform), as represented in FIG. 1.

According to one embodiment, the turbine assembly 1 forms part of a turbomachine turbine 100. The turbomachine turbine 100 comprises an external casing 200 (or spacer), a movable vane and a nozzle placed upstream of the vane movably mounted in rotation around the axial direction DA in the external casing 200. According to one embodiment, the turbine nozzle 1 comprises or is formed by the turbine assembly 1. According to another embodiment, a shroud forming part of the turbine casing and surrounding the movable turbine vane may be formed by or comprise the turbine assembly 1. According to another embodiment, the turbomachine turbine 100 comprises an external casing 200 comprising this turbine casing shroud 200, a movable vane surrounded by the turbine casing shroud 200, and another turbine nozzle placed upstream of the vane movably mounted in rotation around the axial direction DA in the external casing 200.

According to one embodiment, the turbine nozzle 1 can be a high-pressure nozzle of the turbine 100, i.e. a nozzle of the high-pressure turbine 100 (or high-pressure module) of the turbomachine. The high-pressure module is arranged at the outlet of a combustion chamber of the turbomachine and upstream of a low-pressure module, comprising one or several low-pressure stage(s) each comprising another low-pressure nozzle carried by the turbine casing and a movable wheel located downstream of this other low-pressure nozzle. The turbine 100 may form part of an aircraft turbojet engine or of an aircraft turboprop. The movable wheel and the movable vane are fixed to a turbine shaft extending along the axial direction DA and are able to rotate in a direction of rotation around this axial direction DA during the operation of the turbine 100. The radial directions are taken in a plane transverse to the axial direction DA and start from this axial direction DA, by being oriented in a centrifugal manner from inside to outside. The casing 200 surrounds the movable vane around the axial direction DA. A gas stream 310 is delimited between the external wall 11, the internal wall 30 and the stationary vanes 20. Of course, the turbine nozzle 1 according to the invention may be a low-pressure nozzle of the turbine 100, i.e. a nozzle of the low-pressure module of the turbomachine.

Figure 2:
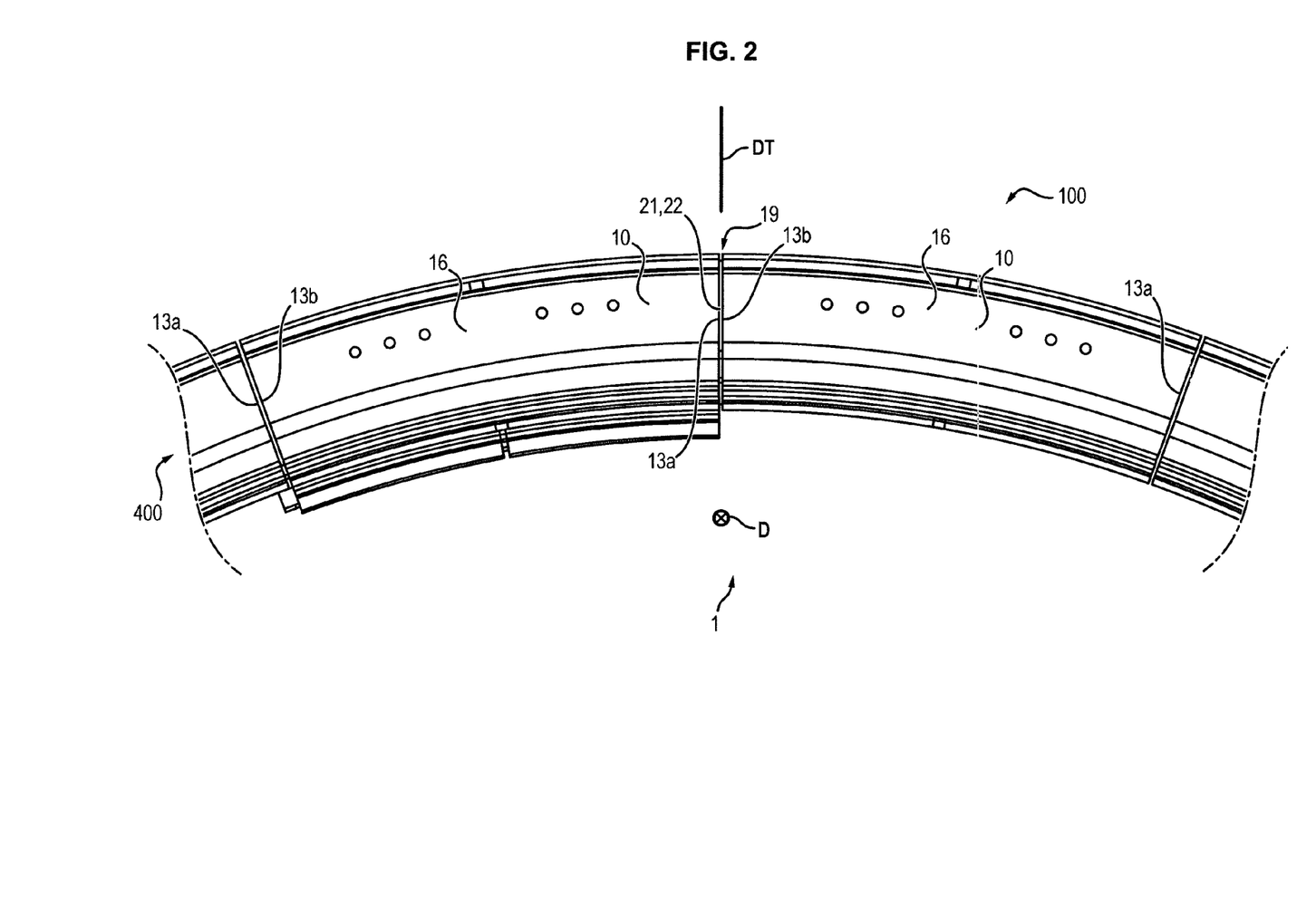
FIG. 2 represents a schematic front view of a portion of a turbine assembly, seen from upstream, according to one embodiment of the invention.

According to the invention, each ring sector 10 is circumferentially delimited by its two connection faces 13a and 13b, as represented in FIGS. 1 and 2. As represented in FIGS. 3 to 13, at least some of the ring sectors 10 disposed end-to-end, i.e. adjacent in a circumferential manner, have adjacent connection faces 13a, 13b, which are linked by at least a first curved sealing tab 21, inserted in a first curved internal groove 31 of the connection faces 13a, 13b, and by at least a second curved sealing tab 22, inserted in a second curved internal groove 32 of the connection faces 13a, 13b. The second curved internal groove 32 is connected to the first curved internal groove 31. One or several other second sealing tab(s) may be provided, i.e. other than the second sealing tab 22, in other corresponding internal grooves, such as for example the sealing tab 23 below. This or these other second sealing tab(s) may have a shape similar to the second sealing tab 22 and be in contact against each other, in a manner similar to the tabs 21 and 22. What is described is also valid for the sealing tab(s) other than the first sealing tab 21 and the second sealing tab 22.

Figure 12:
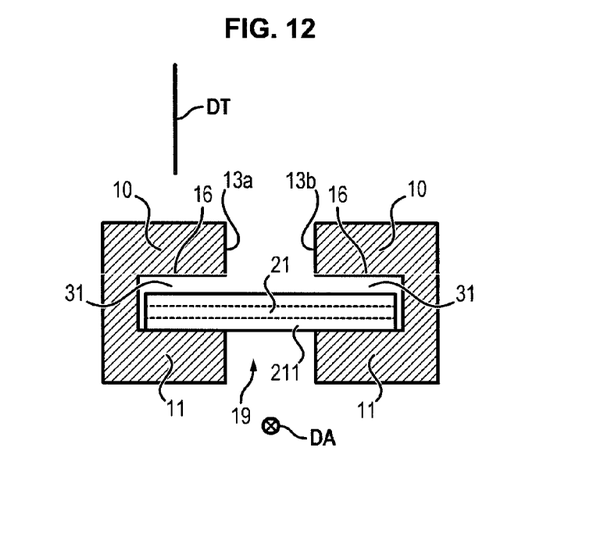
FIG. 12 represents an enlarged schematic view from the front of a portion of a turbine assembly, seen from upstream, according to one embodiment of the invention.

Thus, at least two circumferentially adjacent ring sectors 10 (as for example represented in FIGS. 2 and 12) are linked together by the curved sealing tabs 21, 22 inserted respectively in the internal grooves 31, 32 of their connection face 13a, 13b disposed opposite each other. As represented in FIG. 12, the first sealing tab 21 and its first ends 211, 212 are inserted into the first groove 31 of the two adjacent ring sectors 10, i.e. circumferentially opposite each other, and spans the space 19 located between the connection faces 13a and 13b circumferentially, which are opposite each other and therefore provides the junction between the edges of the ring sectors 10, which are opposite each other. The second sealing tab 22 and its second ends 221, 222 are inserted in the second groove 32 of the two adjacent ring sectors 10, i.e. circumferentially opposite each other, and spans the space 19 located between their connection face 13a and 13b, which are circumferentially opposite each other. This connection by curved sealing tabs 21, 22 may be provided between two ring sectors of one or several pair(s) of ring sectors, which are circumferentially adjacent one after the other, of all pairs of circumferentially adjacent ring sectors, or of some pairs of circumferentially adjacent ring sectors.

The first curved sealing tab 21 extends from upstream to downstream over at least a determined axial length L21 in the longitudinal external wall 11. The second curved sealing tab 22 extends in the rim 12. Each sealing tab has some extent in the circumferential direction, normal to the directions DA and DT.

The first sealing tab 21 and the second sealing tab 22 (and possibly the other second sealing tab(s) 23 described below inserted in the internal groove(s) 33) are curved in a first mounting position (represented in FIGS. 3, 6 and 8) respectively in the first internal groove 31 and in the second internal groove 32.

The second sealing tab 22 has at least a second point 220 which is in contact with a first point 213 of the first sealing tab 21. For example, the first point 213 can be located on an external side 210 of the first sealing tab 21 between two first ends 211, 212 of the first sealing tab 21 or on an internal side of the first sealing tab 21 between two first ends 211, 212 of the first sealing tab 21 or on a lateral side of the first sealing tab 21, and this in the mounting position and in the second bending position in operation, described below. As represented in FIGS. 3 to 8, the first point 213 can be intermediate between the two first ends 211, 212 of the first sealing tab 21. The first point 213 could also be at one of the two first ends 211, 212 of the first sealing tab 21.

Figure 4:
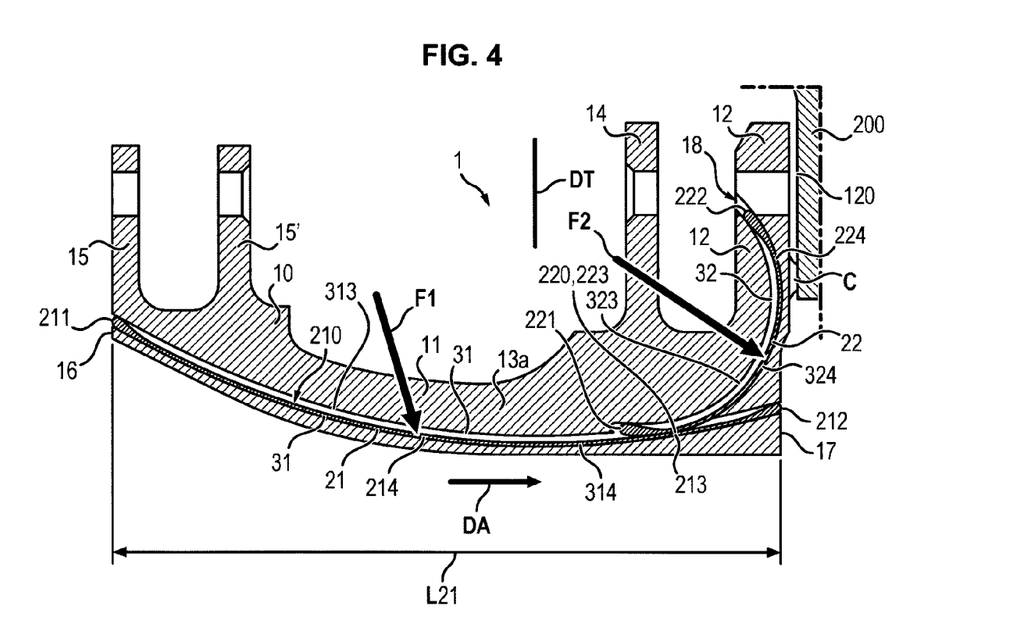
FIG. 4 represents a schematic side view of a ring sector a turbine assembly in a second bending position in operation, according to the first embodiment of the invention according to FIG. 3.
Figure 7:
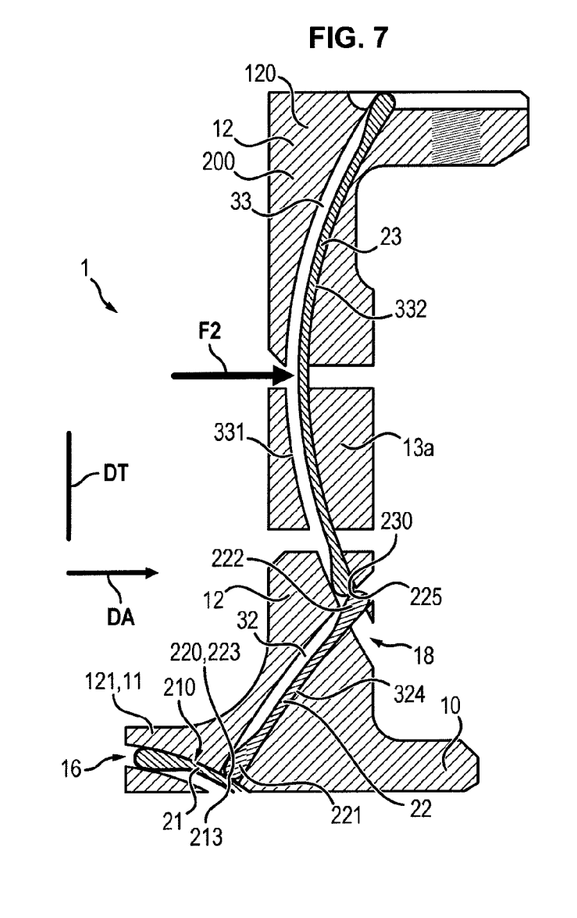
FIG. 7 represents a schematic side view of a ring sector a turbine assembly in a second bending position in operation, according to a third embodiment of the invention.

During the operation of the nozzle 1, an air pressure is exerted from upstream to downstream between the adjacent connection faces 13a, 13b of the adjacent ring sectors 10. The first sealing tab 21 and the second sealing tab 22 have a bending degree of freedom in their respective groove 31, 32 (as represented in FIGS. 4 and 7) starting from this first mounting position in the presence of this air pressure. The second sealing tab 22 is thus able to bend in the second groove 32 until a second bending position where the contact point 220 is pushed against the first sealing tab 21, for example against the external side 210. This results in an extension of the second tab 22 in the groove 32 against the first tab 21. This dynamically increases the sealed contact between the first tab 21 and the second tab 22 in the space 19 located between the faces 13a and 13b of the adjacent ring sectors during the operation of the nozzle 1.

Thus, when, during the operation of the nozzle, pressurized air is sent from upstream to downstream between the ring sectors 10 as represented by the arrows F1 and F2 in FIGS. 4 and 7, the second tab 22 is pushed by this air pressure from its first mounting position to its second bending position in operation towards the bottom of the groove and against the first tab 21. The contact point 220 then moves the first sealing tab 21 towards the bottom of the first groove 31 inwardly. Thus, the pressurized air strengthens the contact of the second tab 22 on the first tab 21 during the operation of the nozzle 1 and therefore increases the sealing between the second tab 22 on the first tab 21 at the contact point 220 touching the point 213. This also allows controlling the positioning of the tabs against each other during operation and preventing tabs from being lost during the operation of the nozzle by avoiding, during operation, the presence of a gap between the tabs.

The first mounting position corresponds for example to a contracted position of the tab 21 or 22 or 23 in its groove 31 or 32 or 33. The second bending position in operation corresponds for example to an extended position of the tab 21 or 22 or 23 in its groove 31 or 32 or 33. The length of the inner arc of the tab 21 or 22 or 23 is for example greater than the length of the bearing side 313 or 314 or 323 or 324 or 331 or 332 of the groove 31 or 32 or 33, in which this tab 21 or 22 or 23 is located.

Figure 3:
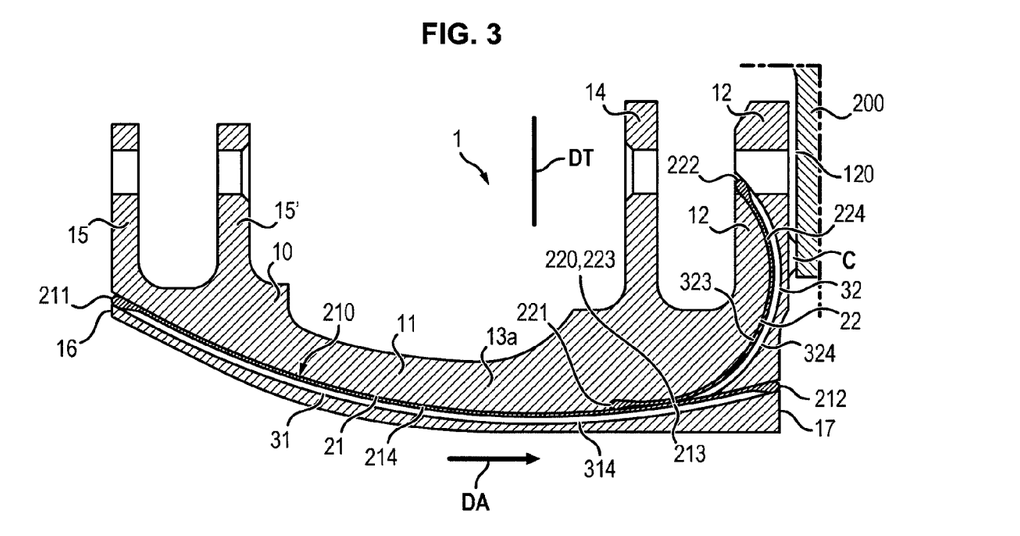
FIG. 3 represents a schematic side view of a ring sector of a turbine assembly in a first mounting position, according to a first embodiment of the invention.

In the mounting position of FIG. 3, the first sealing tab 21 is for example located against the external side 313 of the first internal groove 31, and the second sealing tab 22 is for example located against the external and/or upstream side 323 of the second internal groove 32. In the second bending position in operation of FIG. 4, the first sealing tab 21 is for example located against the internal side 314 of the first internal groove 31, and the second sealing tab 22 is for example located against the internal and/or downstream side 324 of the second internal groove 32.

Figure 6:
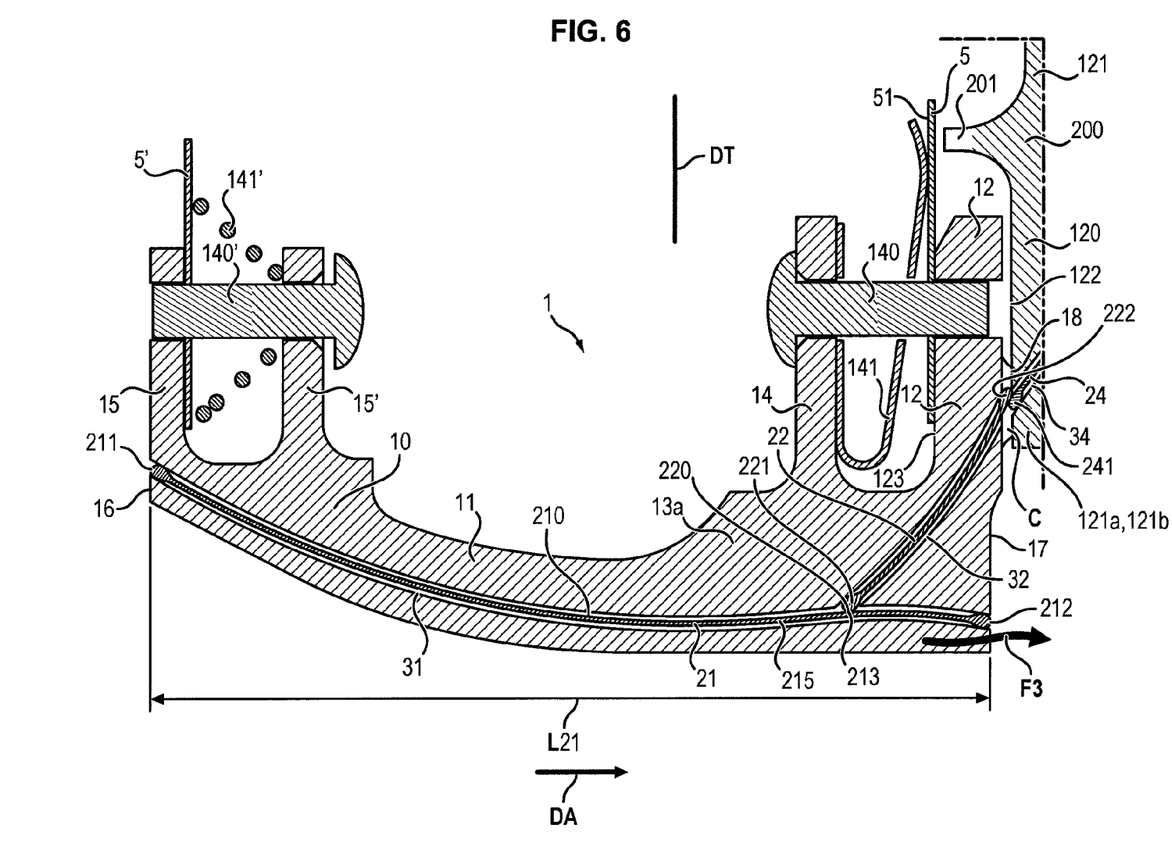
FIG. 6 represents a schematic side view of a ring sector of a turbine assembly in a first mounting position, according to a second embodiment of the invention.
Figure 8:
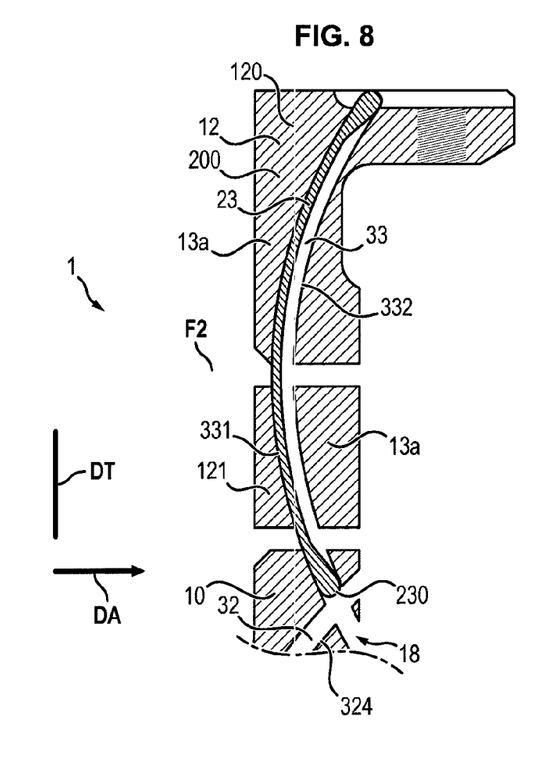
FIG. 8 represents an enlarged schematic side view of a portion of the ring sector in a first mounting position, according to the third embodiment of the invention according to FIG. 7, FIGS. 9, 10 and 11 represent enlarged schematic side views of tabs in their mounting position in their groove of the assembly, according to embodiments of the invention.

In the embodiments represented in FIGS. 6 to 8, the contact point 220 is located at a second end 221 of the second sealing tab 22.

Figure 5:
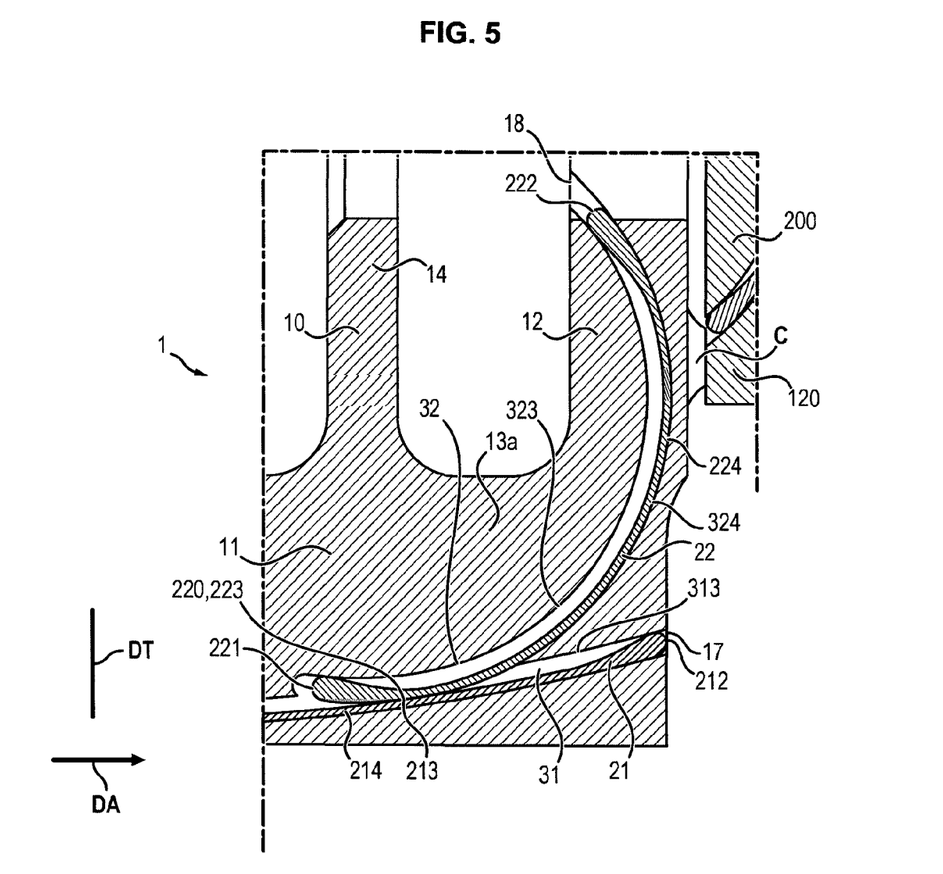
FIG. 5 represents an enlarged schematic side view of the grooves of a ring sector of a turbine assembly, according to the first embodiment of the invention according to FIG. 3.

In the embodiment represented in FIGS. 3, 4 and 5, the contact point 220 is located at least at a second intermediate point 223 of the second sealing tab 22, located between two second ends 221, 222 of the second sealing tab 22. The second curved sealing tab 22 is tangent at this second intermediate point 223 and at this contact point 220 to the first curved sealing tab 21, for example under heat condition. The first internal groove 31 and the second internal groove 32 are tangent to each other around the first point 213 and/or around the second point 223. A contact is thus made over a larger surface between the second sealing tab 22 and the first sealing tab 21. For example, the second sealing tab 22 has a concavity turned in the same direction as the first sealing tab 21 at the second intermediate point 223 and at the first intermediate point 213 (concavity turned outwardly for the tabs 21 and 22 in FIGS. 3 and 4, concavity turned inwardly for the tabs 21 and 22 in FIG. 7). The second internal groove 32 has a concavity turned in the same direction as the first internal groove 31 at the second intermediate point 223 and at the first intermediate point 213 (concavity turned outwardly for the grooves 31 and 32 in FIGS. 3 and 4, concavity turned inwardly for the grooves 31 and 32 in FIG. 7).

In the embodiment represented in FIGS. 6, 7, 8, contact point 220 is located at a second end 221 of the second sealing tab 22.

Figure 13:
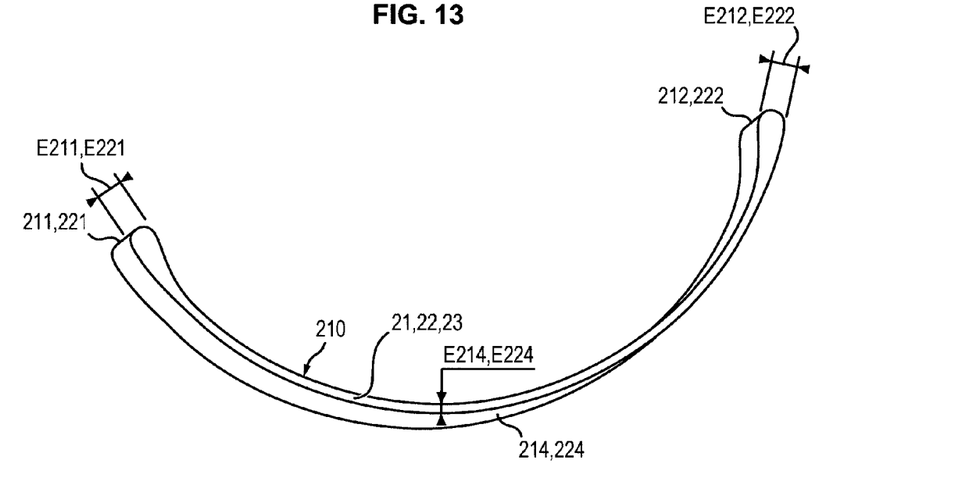
FIG. 13 represents a schematic perspective view of a tab of a turbine assembly, according to a third embodiment of the invention.

In the embodiments represented in FIGS. 3 to 13, the two first ends 211, 212 of the first sealing tab 21 have a first transverse end thickness $E211$, $E212$ greater than a first intermediate transverse thickness $E214$ of a first intermediate portion 214 of the first sealing tab 21, located between the two first ends 211, 212, and are for example rounded. The second sealing tab 22 comprises two second ends 221, 222, which have a second transverse end thickness $E221$, $E222$ greater than a second intermediate transverse thickness $E224$ of a second intermediate portion 224 of the second sealing tab 22, located between the two second ends 221, 222 and which are for example rounded. One example of a tab, which may be the tab 21 or 22 or 23, is represented in FIG. 13 and comprises transversely cylindrical, for examples circular, first ends 211, 212 or second ends 221, 222. This allows limiting the wear of the tabs 21, 22 by contact therebetween, by ensuring a contact of the cylinder-against-plane type between the contact point 220 and the first point 213. The first intermediate portion 214 and the second intermediate portion 224 are curved. The curvature thus allows adaptation to the shape of the ring sectors.

In one embodiment, the first sealing tab 21 and the second sealing tab 22 are prestressed in their mounting position respectively in the first internal groove 31 and in the second internal groove 32. The prestress has the effect of improving the sealing, since it promotes the filling of the clearances between tab and groove. Of course, this characteristic is optional.

In the embodiments represented in FIGS. 3 to 12, the first internal groove 31 opens into a first upstream side 16 of the ring sectors 10 and in a first downstream side 17 of the ring sectors 10 in addition to opening into their connection face 13a, 13b, the tab 21 being thus a through-tab in its groove 31. The second internal groove 32 opens into a second side 18 of the rim 12 of the ring sectors 10 in addition to opening into their connection face 13a, 13b. In FIGS. 3 to 5, the second side 18 is a second upstream side 18 of the rim 12.

In FIGS. 6 to 8, the second side 18 is a second downstream side of the rim 12. This allows overcoming the difficulties of mounting the tabs due to their small thickness.

Figure 9:
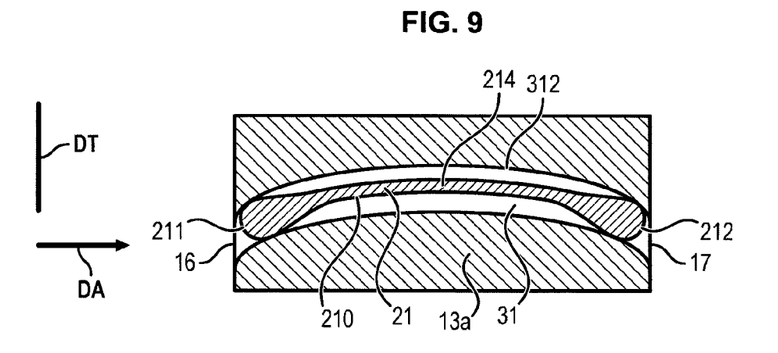
Figure 10:
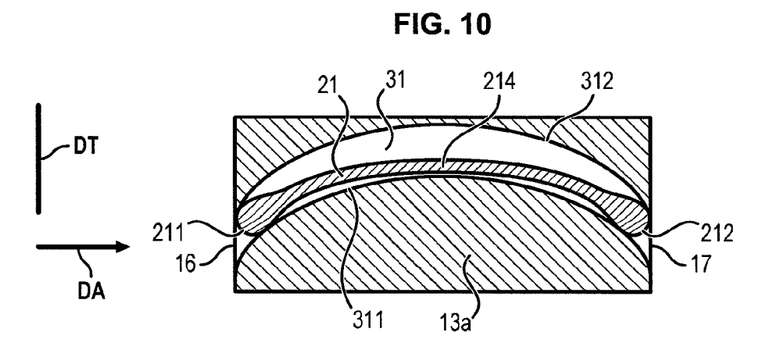
Figure 11:
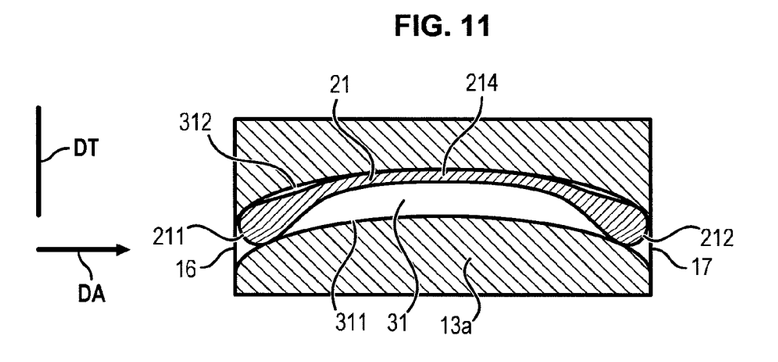

The first sealing tab 21 can for example be centered in the first groove 31, as represented in FIG. 9. The first sealing tab 21 can for example be tangent by its first intermediate portion 214 against the inner curvature 311 of the first groove 31, as represented in FIG. 10. The first sealing tab 21 may be for example tangent by its first intermediate portion 214 against the outer curvature 312 of the first groove 31, as represented in FIG. 11.

In the embodiment represented in FIGS. 7 and 8, another second sealing tab 23 is inserted into another second internal groove 33 of the rim 12, located in the connection faces 13a and 13b, which are circumferentially opposite each other, of the adjacent ring sectors 10. This other second internal groove 33 is connected to the second internal groove 32. This other second internal groove 33 is curved. The other second sealing tab 23 has at least a third point 230 which is in contact with at least a fourth point 225 of the second sealing tab 22. For example, this turbine assembly 1 forms part of a turbine casing shroud 200, (or spacer), intended to surround a movable turbine wheel. The third contact point 230 is located for example at the second end 222 of the second sealing tab 22 and/or on an external side 220 of the second sealing tab 22. The other second sealing tab 23 is curved (and can for example be prestressed or non-prestressed in its mounting position represented in FIG. 8) respectively in the other second internal groove 33 and has a bending degree of freedom from this mounting position in the presence of an air pressure (represented by the arrow F2 in FIG. 7) exerted from upstream to downstream between the adjacent connection faces 13a, 13b of the ring sectors 10 during the operation of the turbine. Thus, in the presence of this air pressure in operation, the other second sealing tab 23 presses inwardly on the second sealing tab 22, pressing itself inwardly on the first sealing tab 21. In the mounting position of FIG. 8, the other second sealing tab 23 is for example located against the upstream side 331 of the other second internal groove 33. In the second bending position in operation of FIG. 7, the other second sealing tab 23 is for example located against the downstream side 332 of the other second internal groove 33, the second sealing tab 22 is for example located against the internal and/or downstream side 324 of the second internal groove 32.

In the embodiment represented in FIG. 6, the first sealing tab 21 has an inflection point 215 between its first ends 211, 212. The tab 21 combines extension and retraction (double curvature), which also allows giving an aerodynamic profile for the air of the stream (Arrow F3) and thus limiting disruptions in the main stream. The second sealing tab 22 could also have an inflection point between its second ends 221, 222.

In the embodiment represented in FIG. 6, the annular structure 400 forms part of a turbine nozzle. The second internal groove 32 opens into a circumferentially bearing downstream protruding area C (called "dutch barn") of the rim 12 of the ring sectors 10, in addition to opening into their connection face 13a, 13b. This circumferentially bearing downstream protruding area C is located in the second downstream side of the rim 12. The turbine assembly 1 further comprises a casing flange 120, which is located downstream of the circumferentially bearing downstream protruding area C and which is configured to carry a movable wheel ring. The circumferentially bearing downstream protruding area C is bearing against the casing flange 120. The casing flange 120 comprises for example flange sectors 121, which are disposed circumferentially end-to-end around the axial direction DA facing the ring sectors 10, these flange sectors 121 being called adjacent flange sectors. At least two of the adjacent flange sectors 121 comprise second adjacent connection faces 121a, 121b, which are linked by at least a third sealing tab 24, inserted into a third internal groove 34 of the second connection faces 121a, 121b. The third internal groove 34 opens into an upstream side 122 of the casing flange 120. The third internal groove 34 is located facing the second internal groove 32 and facing the circumferentially bearing downstream protruding area C. The second sealing tab 22 comprises a second end 222 which is in contact with a third end 241 of the third sealing tab 24 in the vicinity of the circumferentially bearing downstream protruding area C. For example, the second end 222 projects downstream of the circumferentially bearing downstream protruding area C and/or the third end 241 projects, towards the upstream, from the upstream side 122 of the casing flange 120. This also allows sealing the circumferentially bearing downstream protruding area C between the ring sectors 10 which, in the state of the art, would have been subjected to air leaks, as represented by the arrow F in FIG. 1 and by the circle C in FIG. 6. This avoids leaks between this circumferentially bearing downstream protruding area C and the casing flange 120.

In FIGS. 3 to 6, according to one embodiment, each ring sector 10 may comprise one or several intermediate for example radial, external leg(s) 14, present upstream of the downstream external rim 12, and downstream of the upstream external rim 15, wherein the legs extend only facing a portion of the circumference covered by the downstream external rim 12 around the axial direction DA. For example, several intermediate external legs 14 are provided, which are circumferentially spaced from each other and are for example radial. This or these intermediate external tab(s) 14 therefore leave(s) next to it/them outside each ring sector 10 an axial passage for the air facing the downstream external rim 12. Likewise, an upstream external rim 15 can be provided downstream of the leg(s) and a third external rim 15' can be provided upstream of the leg(s) 14.

According to one embodiment, the intermediate external tab(s) 14 are used to fix one or several fixing member(s) 140, such as for example a screw or bolt 140 (which can be screwed into a thread of this or these intermediate external leg(s) 14), in order to fix one or several sealing strip(s) 5 or an annular sealing collar 5 against an upstream face 123 of the rim 12. The fixing member 140 can be bearing against or can pass through the sealing strip(s) 5 or the annular sealing collar 5 against the rim 12. One or several spring part(s) 141, which are for example U bent, can be housed between this or these intermediate external tab(s) 14 on the one hand and the rim 12 on the other hand, and be in compression from upstream to downstream against the upstream face 51 of the sealing strip(s) 5 or of the sealing peripheral collar 5. One or several fixing member(s) 140' similar to the fixing member 140 and one or several spring part(s) 141' similar to the spring part(s) 141 can also be provided on the external rim 15' in order to fix one or several other sealing strip(s) 5' or another annular sealing collar 5' against the downstream face of the third external rim 15. The annular sealing collar 5 and/or 5' surrounds for example the ring sectors 10 around the axial direction DA.

Of course, the embodiments, characteristics and examples above can be combined with each other or be selected independently from each other.

The invention claimed is:

1. A turbine assembly, comprising an annular structure extending circumferentially around an axial direction from upstream to downstream and comprising a plurality of ring sectors disposed circumferentially end-to-end, called adjacent ring sectors, each ring sector comprising at least one wall extending from upstream to downstream and at least one rim, protruding from the at least one wall in a radial direction, which extends away from the at least one wall, at least two adjacent ring sectors comprising adjacent connection faces, which each have a first internal groove and a second internal groove connected to the first internal groove, wherein the adjacent connection faces of the at least two adjacent ring sectors are linked by at least a first sealing tab, inserted into the first internal grooves, and by at least a second sealing tab, inserted into the second internal grooves, the first sealing tab extending from upstream to downstream on at least a determined axial length in the at least one wall and the second sealing tab extending into the at least one rim, wherein the first internal grooves and the second internal grooves are curved, the first sealing tab and the second sealing tab are curved in a mounting position respectively in the first internal grooves and in the second internal grooves and have a bending degree of freedom starting from their mounting position in the presence of an air pressure exerted from upstream to downstream between the adjacent connection faces of the at least two adjacent ring sectors during operation, the second sealing tab having at least a second point which is in contact with at least a first point of the first sealing tab.

2. The turbine assembly according to claim 1, wherein the first point is intermediate between two first ends of the first sealing tab.

3. The turbine assembly according to claim 1, wherein the first point is located at a first end of the first sealing tab.

4. The turbine assembly according to claim 1, wherein the second point is intermediate between two second ends of the second sealing tab.

5. The turbine assembly according to claim 1, wherein the second point is located at a second end of the second sealing tab.

6. The turbine assembly according to claim 1, wherein the first point is intermediate between two first ends of the first sealing tab, the second point is intermediate between two second ends of the second sealing tab, the second sealing tab being tangent at this second point and/or at this first point to the first sealing tab.

7. The turbine assembly according to claim 6, wherein in each of the adjacent connection faces the first internal groove and the second internal groove are tangent to each other at the first point and/or at the second point.

8. The turbine assembly according to claim 1, wherein the first sealing tab comprises two first ends, which are rounded and which have a first transverse end thickness, which is greater than a first intermediate transverse thickness of a first intermediate portion of the first sealing tab, located between the two first ends, and/or the second sealing tab comprises two second ends, which are rounded and which have a second transverse end thickness which is greater than a second intermediate transverse thickness of a second intermediate portion of the second sealing tab, located between the two second ends.

9. The turbine assembly according to claim 1, wherein the first sealing tab and the second sealing tab are prestressed in their mounting position respectively in the first internal groove and in the second internal groove.

10. The turbine assembly according to claim 1, wherein in each of the adjacent connection faces the first internal groove opens into a first upstream side of the ring sectors and in a first downstream side of the ring sectors in addition to opening into their adjacent connection face, while the second internal groove opens into a second upstream or downstream side of the at least one rim of the ring sectors in addition to opening into their adjacent connection face.

11. The turbine assembly according to claim 1, wherein the first sealing tab has an inflection point between its first ends and/or the second sealing tab has an inflection point between its second ends.

12. The turbine assembly according to claim 1, wherein the annular structure forms part of a turbine nozzle, in each of the adjacent connection faces the second internal groove opens into a circumferential bearing downstream protruding area for circumferential bearing of the at least one rim of the ring sectors in addition to opening into their adjacent connection face, the turbine assembly further comprises a casing flange, which is located downstream of the circumferentially bearing downstream protruding area and against which bears the circumferentially bearing downstream protruding area, the casing flange comprising flange sectors disposed circumferentially end-to-end around the axial direction, called adjacent flange sectors, facing the ring sectors, at least two of the adjacent flange sectors comprising second adjacent connection faces, which each have a third internal groove, wherein the second adjacent connection faces of the at least two of the adjacent flange sectors are linked by least a third sealing tab, inserted in the third internal grooves, wherein in each of the adjacent connection faces and of the second adjacent connection faces the third internal groove opens into an upstream side of the second adjacent connection faces and being located facing the second internal groove and facing the circumferentially bearing downstream protruding area, the second sealing tab comprises a second end in contact with a third end of the third sealing tab.

13. The turbine assembly according to claim 12, wherein the second end projects downstream of the circumferentially bearing downstream protruding area and/or the third end projects, towards the upstream, from the upstream side of the second adjacent connection faces.

* * * * *